United States Patent
James et al.

(10) Patent No.: US 10,247,095 B2
(45) Date of Patent: Apr. 2, 2019

(54) REDUCED TRIM FLOW GAS TURBINE ENGINE OIL SYSTEM

(71) Applicant: United Technologies Corporation, Hartford, CT (US)

(72) Inventors: Denman H. James, Windsor, CT (US); Jorn A. Glahn, Manchester, CT (US)

(73) Assignee: United Technologies Corporation, Farmington, CT (US)

(*) Notice: Subject to any disclaimer, the term of this patent is extended or adjusted under 35 U.S.C. 154(b) by 1659 days.

(21) Appl. No.: 13/741,425

(22) Filed: Jan. 15, 2013

(65) Prior Publication Data

US 2014/0090355 A1 Apr. 3, 2014

Related U.S. Application Data

(60) Provisional application No. 61/706,929, filed on Sep. 28, 2012.

(51) Int. Cl.
*F02K 3/00* (2006.01)
*F02C 7/06* (2006.01)
*F01D 25/20* (2006.01)

(52) U.S. Cl.
CPC ............... *F02C 7/06* (2013.01); *F01D 25/20* (2013.01); *F02K 3/00* (2013.01); *F05D 2220/36* (2013.01); *F05D 2260/40311* (2013.01); *F16N 2210/02* (2013.01); *Y02T 50/671* (2013.01); *Y10T 29/49236* (2015.01)

(58) Field of Classification Search
CPC .... F02K 3/00; F02C 7/06; F02C 7/714; F01D 25/18; F16N 2210/02
USPC .............................................. 60/39.08, 226.1
See application file for complete search history.

(56) References Cited

U.S. PATENT DOCUMENTS

| | | |
|---|---|---|
| 2,991,845 A | 7/1961 | Scheffler, Jr. |
| 4,245,465 A | 1/1981 | Milo |
| 4,569,169 A | 2/1986 | Madray |
| 4,696,156 A | 9/1987 | Burr et al. |
| 5,067,454 A | 11/1991 | Waddington et al. |
| 5,107,676 A | 4/1992 | Hadaway et al. |
| 5,272,868 A | 12/1993 | Ciokajlo et al. |
| 6,058,694 A | 5/2000 | Ackerman et al. |
| 8,205,427 B2 | 6/2012 | Schwarz et al. |
| 8,256,576 B2 | 9/2012 | Glahn et al. |
| 8,261,527 B1 | 9/2012 | Stearns et al. |
| 2006/0223664 A1 | 10/2006 | Duong et al. |
| 2010/0056315 A1 | 3/2010 | Scholte-Wassink |
| 2011/0023444 A1 | 2/2011 | Veilleux, Jr. |
| 2011/0108360 A1 | 5/2011 | DiBenedetto |

(Continued)

OTHER PUBLICATIONS

International Search Report and Written Opinion for PCT Application No. PCT/US2013/061311 dated Jan. 8, 2014.

(Continued)

*Primary Examiner* — Patrick Hamo
(74) *Attorney, Agent, or Firm* — Carlson, Gaskey & Olds, P.C.

(57) ABSTRACT

A disclosed lubrication system for a gas turbine engine includes a primary passage defining a flow path for lubricant to a gas turbine engine and a bypass passage defining a flow path for lubricant around the gas turbine engine. The lubrication system further includes a primary lubrication pump including a reduced total flow capacity of lubricant with a reduced bypass lubricant flow relative to the total overall flow capacity.

13 Claims, 1 Drawing Sheet

(56) References Cited

U.S. PATENT DOCUMENTS

2011/0297485 A1   12/2011   Sheridan et al.

OTHER PUBLICATIONS

International Preliminary Report on Patentability for PCT Application No. PCT/US2013/061311, dated Apr. 9, 2015.
European Search Report for EP Application No. 13840271.4 dated Oct. 19, 2015.

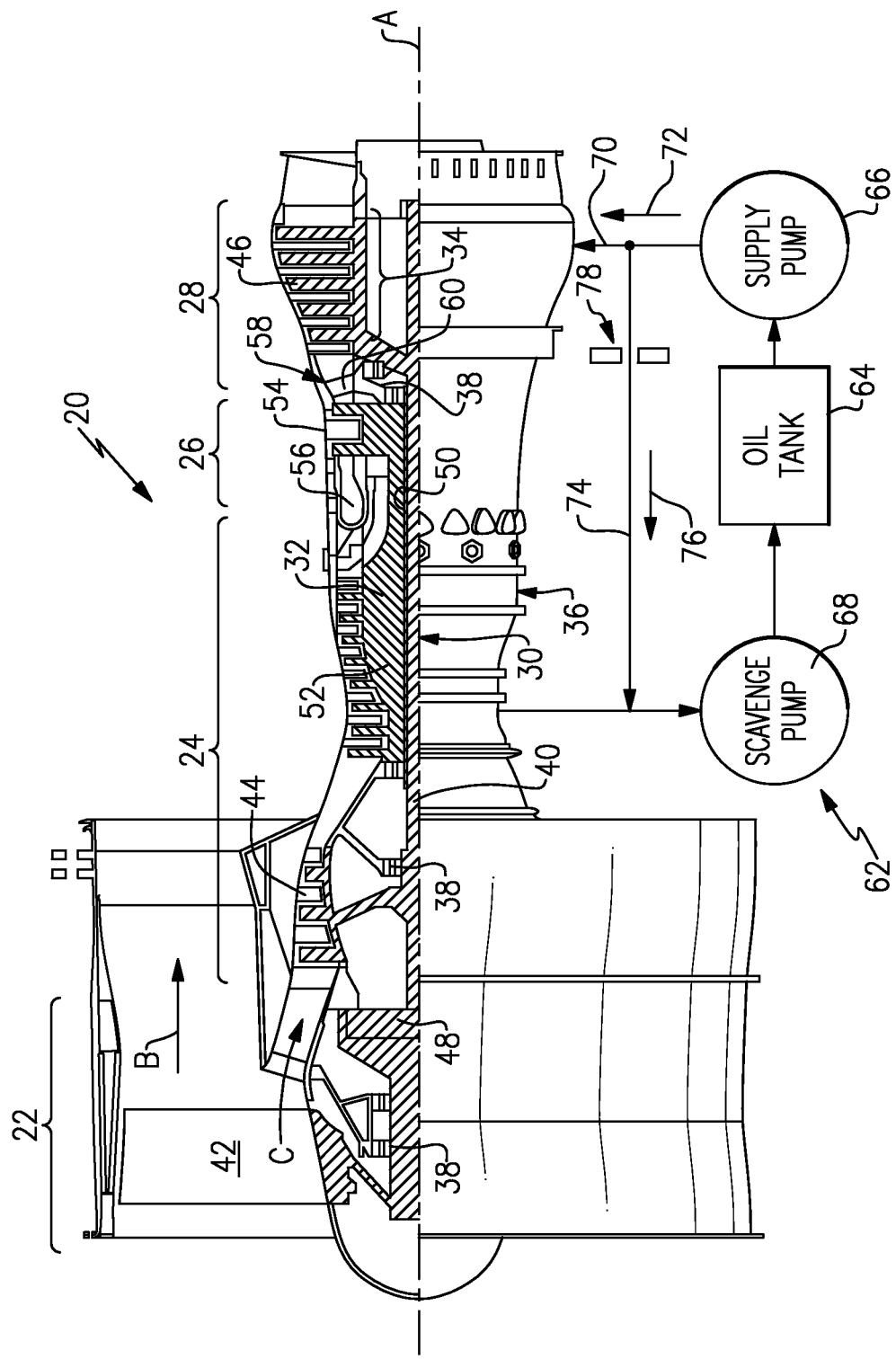

REDUCED TRIM FLOW GAS TURBINE ENGINE OIL SYSTEM

CROSS REFERENCE TO RELATED APPLICATION

This application claims priority to U.S. Provisional Application No. 61/706,929 filed on Sep. 28, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines. The high pressure turbine drives the high pressure compressor through an outer shaft to form a high spool, and the low pressure turbine drives the low pressure compressor through an inner shaft to form a low spool. The fan section may also be driven by the low inner shaft.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds. The gear assembly requires increases the amount of lubricant required as compared to direct drive gas turbine engines. Increased amounts of lubricant may result in larger lubrication system components that may decrease the gains in efficiency provided by the gear assembly.

Although geared architectures have improved propulsive efficiency, turbine engine manufacturers continue to seek further improvements to engine performance including improvements to thermal, transfer and propulsive efficiencies.

SUMMARY

A gas turbine engine according to an exemplary embodiment of this disclosure, among other possible things includes a fan section including a plurality of fan blades rotatable about an axis. A core engine includes a compressor section, a combustor in fluid communication with the compressor section, a turbine section in fluid communication with the combustor, and a geared architecture driven by the turbine section for rotating the fan. A lubrication system directs lubricant to components of the core engine and fan section. The lubricant system includes a total flow capacity of lubricant equal to or less then about 110% of core engine and fan section lubricant flow requirements.

In a further embodiment of the foregoing gas turbine engine, the total flow capacity includes a primary flow capacity routed to the core engine and fan section and a bypass flow capacity routed around the core engine and fan section.

In a further embodiment of any of the foregoing gas turbine engines, the bypass flow capacity is less than about 10% of the total flow capacity.

In a further embodiment of any of the foregoing gas turbine engines, the total flow capacity is between about 108% and 104% of core engine and fan section lubricant flow requirements and the bypass flow capacity is between about 8% and about 4% of the total flow capacity.

In a further embodiment of any of the foregoing gas turbine engines, the total flow capacity is less than or equal to about 105% of core engine and fan section lubricant flow requirements and the bypass flow capacity is about 5% of total flow capacity.

In a further embodiment of any of the foregoing gas turbine engines, the lubricant system includes a primary supply pump having a flow capacity equal to about the total flow capacity of lubricant.

In a further embodiment of any of the foregoing gas turbine engines, includes a bypass flow passage routing a bypass flow of lubricant around the core engine and the fan section to a lubricant supply.

In a further embodiment of any of the foregoing gas turbine engines, the bypass flow passage includes a trim restrictor for setting the bypass flow of lubricant around the core engine and the fan section.

A lubrication system for a gas turbine engine according to an exemplary embodiment of this disclosure, among other possible things includes a primary passage defining a flow path for lubricant to a gas turbine engine, a bypass passage defining a flow path for lubricant around the gas turbine engine, and a primary lubrication pump including a total flow capacity of lubricant equal to or less then about 110% of engine lubricant flow requirements.

In a further embodiment of the foregoing lubrication system, the total flow capacity includes a primary flow capacity routed to the gas turbine engine and a bypass flow capacity routed around the gas turbine engine.

In a further embodiment of any of the foregoing lubrication systems, the bypass flow capacity is less than about 10% of the total flow capacity.

In a further embodiment of any of the foregoing lubrication systems, the total flow capacity is between about 108% and 104% of the gas turbine engine lubricant flow requirements and the bypass flow capacity is between about 8% and about 4% of the total flow capacity.

In a further embodiment of any of the foregoing lubrication systems, the total flow capacity is less than or equal to about 105% of the gas turbine engine lubricant flow requirements and the bypass flow capacity is about 5% of total flow capacity.

In a further embodiment of any of the foregoing lubrication systems, includes a geared architecture driven by a turbine section for rotating a fan section about an axis.

A method of assembling a lubricant system for a gas turbine engine according to an exemplary embodiment of this disclosure, among other possible things includes defining a primary a flow path for directing lubricant to a gas turbine engine, defining a bypass flow path for directing lubricant around the gas turbine engine, and defining a primary lubrication pump capable of providing a total flow capacity of lubricant equal to or less then about 110% of engine lubricant flow requirements. The total flow capacity includes a primary flow capacity routed to the gas turbine engine and a bypass flow capacity routed around the gas turbine engine and the bypass flow capacity is less than about 10% of the total flow capacity.

In a further embodiment of the foregoing method, the total flow capacity is between about 108% and 104% of the gas turbine engine lubricant flow requirements and the bypass flow capacity is between about 8% and about 4% of the total flow capacity.

In a further embodiment of any of the foregoing methods, the total flow capacity is less than or equal to about 105% of the gas turbine engine lubricant flow requirements and the bypass flow capacity is about 5% of total flow capacity.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 1 is a schematic view of an example gas turbine engine and lubrication system.

DETAILED DESCRIPTION

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV")

system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors.

A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example engine 20 includes a lubrication system 62 that provides lubricant to the geared architecture 48, and bearing systems 38. The lubrication system 62 includes a primary supply pump 66 that draws lubricant from a supply 64 through a primary passage 70 to components of the engine 20. Although the primary passage 70 is shown schematically as a single passage, the primary passage 70 includes a plurality of branches that direct lubricant to features and structures throughout the engine 20.

A scavenge pump 68 draws lubricant from sumps and other lubricant gathering features that accumulate lubricant flowing from the corresponding bearing system 38 or geared architecture 48 and returns the used lubricant to the supply 64. Accordingly, a fresh supply of lubricant is continually cycled through the bearing systems 38 and the geared architecture 48. A portion of the total lubricant flow is routed through a bypass passage 74 and around the systems requiring lubricant.

Lubricant systems are generally designed with excess capacity in order to meet future needs and/or performance degradation of components in the field. The excess capacity is by design diverted around the engine 20 through a bypass passage and returned to the oil tank 64 directly until a "trim" is adjusted to divide lubricant flow between the primary lubricant passage 70 and the bypass passage 74. Diverting the unneeded portion of the total lubricant flow is a performance benefit that reduces associated parasitic losses which would occur if all of the total lubricant flow in excess of current need was sent to the engine 20. Diversion of flow is governed by a trim restrictor 78 disposed within the bypass passage 74.

In geared turbofan engines, the total engine oil flow increased substantially to meet the needs of the epicyclical gear train. Accordingly, typical engine bypass lubricant flows that are determined based on typical engine demands would result in very large bypass lubricant flows that could reduce overall engine efficiency.

The disclosed lubricant system 62 utilizes a bypass flow 76 as a percentage of total lubricant flow capacity that is lower than previously desirable. The total lubricant flow includes the primary lubricant flow 72 through the primary passage and the bypass lubricant flow 76 through the bypass passage 74. The example gas turbine engine 20 includes the geared architecture 48 that accounts for a substantial portion of the primary lubricant flow 72, and therefore variation in the primary lubricant flow 72 responsive to changes in lubricant demand by the geared architecture 48 are likely sufficiently small so as to not require additional capacity during the operational life of the engine 20.

Accordingly, the disclosed lubricant system 62 includes an engine trim or bypass flow 76 that is less than or equal to about 10% of the total possible lubricant flow through the system. In another disclosed embodiment the bypass lubricant flow is between about 8% and about 4% of total oil flow through the lubricant system 62. In a further disclosed embodiment of the example lubricant system 62 includes a bypass lubricant flow that is about 5% of total oil flow through the lubricant system 62.

The reduction in bypass lubricant flow corresponds with a decrease in flow capacity provided in the bypass flow passage 74. Similarly, the primary flow passage 70 is sized to provide for the desired primary lubricant flows 72 to the engine 20.

The benefit of the disclosed bypass lubricant flow translates to reduction in power and capacity required by the supply pump 66 and the scavenge pump 68. This is an overall benefit in cost, weight and performance due to the smaller components, reduced power consumption and lower resulting parasitic losses on the engine system.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a fan section including a plurality of fan blades rotatable about an axis;
a core engine including a compressor section, a combustor in fluid communication with the compressor section, a turbine section in fluid communication with the combustor, and a geared architecture driven by the turbine section for rotating the fan; and
a lubrication system for directing lubricant to components of the core engine and fan section, the lubricant system including a total flow capacity of lubricant equal to or less than about 110% of core engine and fan section lubricant flow requirements, wherein the total flow capacity includes a primary flow capacity routed to the core engine and fan section and a bypass flow capacity routed around the core engine and fan section and the bypass flow capacity is less than about 10% of the total flow capacity.

2. The gas turbine engine as recited in claim 1, wherein the total flow capacity is between about 108% and 104% of core engine and fan section lubricant flow requirements and the bypass flow capacity is between about 8% and about 4% of the total flow capacity.

3. The gas turbine engine as recited in claim 1, wherein the total flow capacity is less than or equal to about 105% of core engine and fan section lubricant flow requirements and the bypass flow capacity is about 5% of total flow capacity.

4. The gas turbine engine as recited in claim 1, wherein the lubricant system includes a primary supply pump having a flow capacity equal to about the total flow capacity of lubricant.

5. The gas turbine engine as recited in claim 1, including a bypass flow passage routing a bypass flow of lubricant around the core engine and the fan section to a lubricant supply.

6. The gas turbine as recited in claim 5, wherein the bypass flow passage includes a trim restrictor for setting the bypass flow of lubricant around the core engine and the fan section.

7. A lubrication system for a gas turbine engine comprising:
    a primary passage defining a flow path for lubricant to a gas turbine engine;
    a bypass passage defining a flow path for lubricant around the gas turbine engine; and
    a primary lubrication pump including a total flow capacity of lubricant equal to or less than about 110% of engine lubricant flow requirements, wherein the total flow capacity includes a primary flow capacity routed to the gas turbine engine and a bypass flow capacity routed around the gas turbine engine and the bypass flow capacity is less than about 10% of the total flow capacity.

8. The lubrication system as recited in claim 7, wherein the total flow capacity is between about 108% and 104% of the gas turbine engine lubricant flow requirements and the bypass flow capacity is between about 8% and about 4% of the total flow capacity.

9. The lubrication system as recited in claim 7, wherein the total flow capacity is less than or equal to about 105% of the gas turbine engine lubricant flow requirements and the bypass flow capacity is about 5% of total flow capacity.

10. The lubrication system as recited in claim 7, including a geared architecture driven by a turbine section for rotating a fan section about an axis.

11. A method of assembling a lubrication system for a gas turbine engine including:
    defining a primary a flow path for directing lubricant to a gas turbine engine;
    defining a bypass flow path for directing lubricant around the gas turbine engine; and
    defining a primary lubrication pump capable of providing a total flow capacity of lubricant equal to or less then about 110% of engine lubricant flow requirements, wherein the total flow capacity includes a primary flow capacity routed to the gas turbine engine and a bypass flow capacity routed around the gas turbine engine and the bypass flow capacity is less than about 10% of the total flow capacity.

12. The method as recited in claim 11, wherein the total flow capacity is between about 108% and 104% of the gas turbine engine lubricant flow requirements and the bypass flow capacity is between about 8% and about 4% of the total flow capacity.

13. The method as recited in claim 11, wherein the total flow capacity is less than or equal to about 105% of the gas turbine engine lubricant flow requirements and the bypass flow capacity is about 5% of total flow capacity.

\* \* \* \* \*